(12) United States Patent
Wallace

(10) Patent No.: US 6,299,430 B1
(45) Date of Patent: Oct. 9, 2001

(54) COOLING MEDIUM INJECTION FOR PELLET MILL ROLLERS

(75) Inventor: Brendan J. Wallace, Wexford (IE)

(73) Assignee: Consolidated Process Machinery, Inc., Merrimack, NH (US)

( * ) Notice: Subject to any disclaimer, the term of this patent is extended or adjusted under 35 U.S.C. 154(b) by 0 days.

(21) Appl. No.: 09/213,252

(22) Filed: Dec. 17, 1998

(51) Int. Cl.[7] .................................................. B29B 9/00
(52) U.S. Cl. ............... 425/314; 425/331; 425/DIG. 230; 100/905
(58) Field of Search .................................. 425/310, 314, 425/331, DIG. 230; 100/905

(56) References Cited

U.S. PATENT DOCUMENTS

| | | | |
|---|---|---|---|
| 2,670,697 | * 3/1954 | Meakin | 425/107 |
| 2,887,718 | * 5/1959 | Curran et al. | 425/311 |
| 3,354,845 | * 11/1967 | Schultz | 425/190 |
| 3,467,031 | * 9/1969 | Hafliger | 425/331 |
| 5,009,586 | * 4/1991 | Pallmann | 425/311 |
| 5,292,240 | * 3/1994 | Capelle | 425/142 |
| 5,585,124 | * 12/1996 | Bittner | 425/331 |

* cited by examiner

*Primary Examiner*—Nam Nguyen
*Assistant Examiner*—Donald Heckenberg

(57) ABSTRACT

The pellet mill includes a ring die having die openings and rollers within a die cavity defined by the ring die whereby material fed to the die cavity and in the nips between the rollers and ring die is extruded through the openings to form pellets. The roller shafts are cooled by a water injector comprised of a tube disposed within and spaced radially from the interior surfaces of a bore through the roller shaft. A fitting at one end of the tube has an inlet for supplying cooling water to the interior of the tube. A return passage for the heated cooling medium is provided in the annular space between the tube and the bore terminating in an outlet in the fitting. In this manner, the roller bearings and lubricant are cooled.

12 Claims, 2 Drawing Sheets

COOLING MEDIUM INJECTION FOR PELLET MILL ROLLERS

TECHNICAL FIELD

The present invention relates generally to pellet mills for agglomerating individual ingredients or mixtures (feed material) by compacting and forcing the ingredients or mixtures through die openings and particularly relates to a pellet mill having rollers within the die cavity and which rollers have bearings and bearing lubricant cooled by a cooling medium injected into the roller shafts.

BACKGROUND OF THE INVENTION

Conventional pellet mills typically employ a rotating ring die with stationary rollers within a die cavity defined by the ring die. Feed material within the cavity is extruded through the openings of the ring die to form pellets. Particularly, the feed material is conventionally fed by gravity from a feed chute into the die cavity where the feed material lies in nips between the ring die and rollers within the cavity. Rotation of the ring die causes rotation of the rollers about fixed shafts within the die cavity, causing the feed material in the nips to be extruded through the ring die apertures to the outside diameter of the die, thereby forming pellets. In another form of a pellet mill such as disclosed in a companion U.S. patent application Ser. No. 09/192,436, filed Nov. 16, 1998 of common assignee herewith, the disclosure of which is incorporated herein by reference, the rollers within the die cavity are mounted on a carriage for rotation about the die cavity relative to a fixed ring die.

In both types of pellet mills, the rollers are subject to high temperatures resulting from the pelleting process. Bearing failures in the pellet mill rollers have become an increasing problem, particularly in view of demands for higher product throughput and faster continuous operation. Cooling the bearings with forced oil lubrication has not proven reliable, as shaft oil seals often fail as a result of the harsh environment of the pelleting die cavity. A grease lubricant can also be used in the bearing. However, grease does not cool the bearing or dissipate heat and, in fact, can generate heat as a result of friction when a large volume of grease is forced into the roller bearing ways. Consequently, there has developed a need for apparatus for effectively cooling the roller bearings in a pellet mill.

BRIEF SUMMARY OF THE INVENTION

In accordance with the present invention, the shafts on which the rollers are mounted are provided with a cooling medium injection apparatus for forming cooling medium supply and return passages. Particularly, the supply and return passages for the cooling medium are provided in a single bore formed in and through one end of each roller shaft at a location which is either coaxial with or offset from and parallel to the axis of the shaft. Preferably, the supply and return passages are concentric with one another, with the supply passage lying within the return passage. Particularly, the injection apparatus includes a coupling at the end of each shaft for securing the supply and return passages to a cooling medium supply source and a return reservoir, respectively, and an elongated tube projecting from the coupling. By providing a single drilled bore hole in each shaft from one end of the shaft, the internal tube of the injection apparatus may be inserted into and spaced from the walls of the bore hole. In this manner, the annular passage between the tube and the bore hole wall formed the return passage while the tube per se forms the supply passage. With the end of the tube spaced from the end of the bore hole, the cooling medium, preferably water, may be supplied into the tube and returned from the shaft via the annular passage for cooling the bearings.

Grease for lubrication purposes is also provided the bearings for the rollers. The cooling medium therefore not only cools the bearings but also cools the supplied lubricant.

In a preferred embodiment according to the present invention, there is provided a pellet mill comprising a ring die defining a die cavity, the ring die having an axis and circumferentially and axially spaced die openings, a carriage mounting a plurality of rollers in the die cavity, the rollers being mounted on shafts carried by the carriage and having axes parallel to the axis of the ring die, a feeder for supplying feed material into the die cavity, a drive for rotating one of the ring die and the carriage relative to one another for extruding feed material in the nips between the ring die and the rollers through the die openings to form pellets, bearings disposed between each shaft and the rollers, cooling medium supply and return passages in each of the shafts generally parallel to the axes thereof and a cooling medium inlet carried by the shaft for supplying a cooling medium to the supply passage and a cooling medium outlet carried by the shaft for receiving heated cooling medium from the return passage.

In a further preferred embodiment according to the present invention, there is provided a pellet mill comprising a ring die defining a die cavity, the ring die having an axis and circumferentially and axially spaced die openings, a roller in the die cavity, the roller being mounted on a shaft having an axis parallel to the axis of the ring die, the shaft having a bore hole opening through one end of the shaft, a feeder for supplying feed material into the die cavity, a drive for rotating one of the ring die and the roller relative to one another for extruding feed material in the nip between the ring die and the roller through the die openings to form pellets, bearings disposed between the fixed shaft and the roller, a cooling medium transmission device for supplying a cooling medium to the shaft for cooling the bearings and including a tube receivable in the bore hole and spaced from walls of the shaft defining an annular passage thereby defining a cooling medium supply passage through one of the tube and the annular passage and a cooling medium return passage through another of the tube and the annular passage and a cooling medium inlet carried by the device for supplying a cooling medium to the supply passage and a cooling medium outlet carried by the device for receiving heated cooling medium from the return passage.

Accordingly, it is a primary object of the present invention to provide a novel cooling injection apparatus for the rollers of a pellet mill whereby a cooling medium can be supplied and returned along the roller shafts for cooling the bearings and any supplied lubricant to the bearings.

BEST MODE FOR CARRYING OUT THE INVENTION

Figure 1:
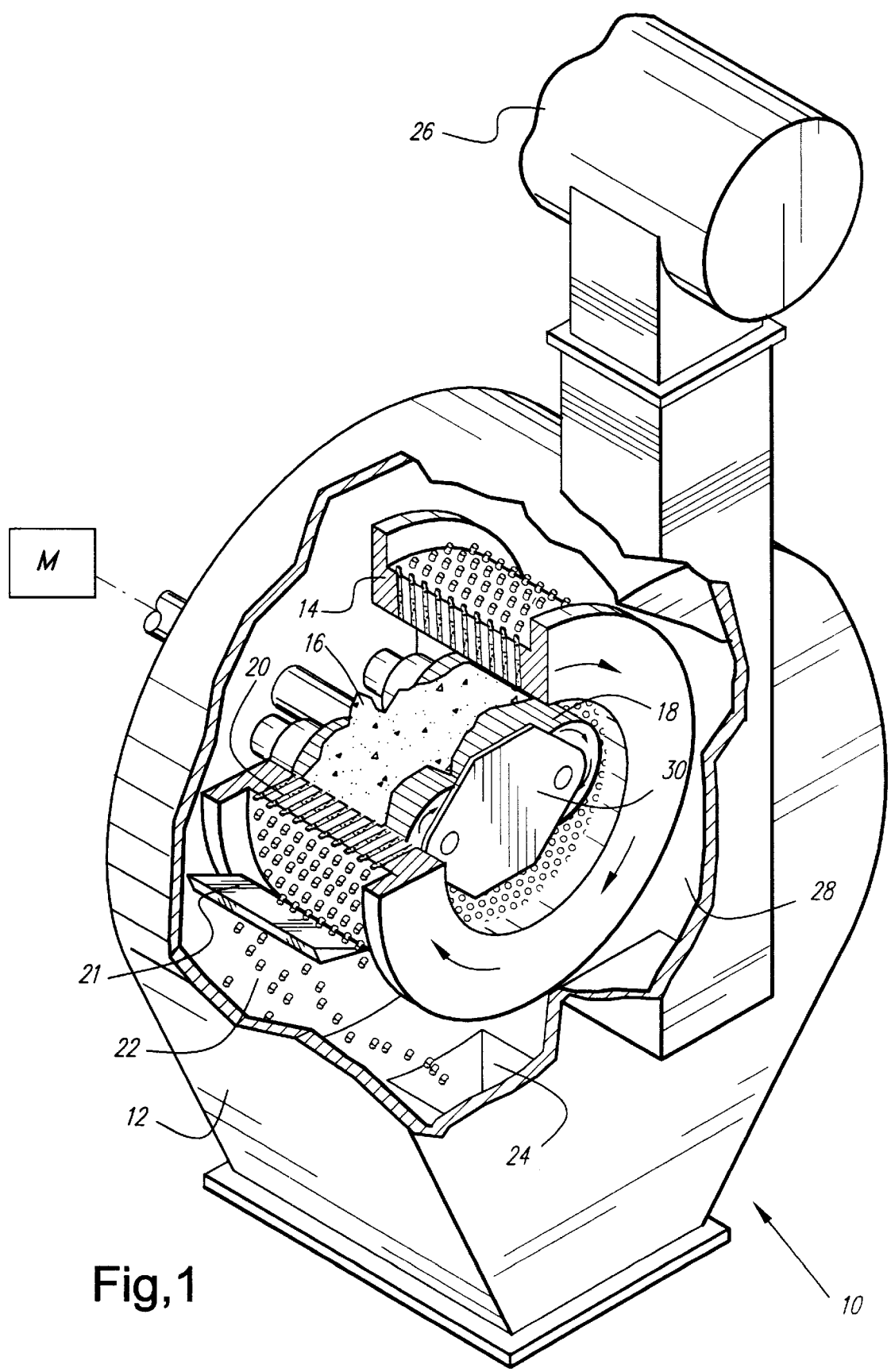
FIG. 1 is a schematic fragmentary perspective view of a pellet mill with parts broken out and in cross-section incorporating a cooling medium injection apparatus according to the present invention.

Referring now to the drawings, particularly to FIG. 1, there is illustrated a pellet mill, generally designated 10, comprising a housing 12 surrounding a ring die 14 defining a die cavity 16 and in which cavity a plurality of rollers 18, two being illustrated, are mounted on a carriage 30. The ring die 14 has a plurality of openings 20 circumferentially and axially spaced one from the other for receiving feed material forced from nips formed within the die cavity between the rollers 18 and the interior surface of the ring die 14. Upon relative rotation of the ring die and the rollers, the feed material is extruded through the openings 20 and thereby form pellets along the outside of the ring die which are removed by one or more blades 21 along the outside of the ring die. The pellets are discharged from the ring die into a housing 22 having an outlet 24 for discharging the formed pellets from the pellet mill.

More particularly and as illustrated, the feed material may be provided from a suitable source to an auger 26 which, in turn, supplies the feed material axially into the die cavity along an inlet passage 28. By suitable drive gearing connected to a drive, e.g., a motor M, the ring die 14 is rotated relative to the carriage C carrying rollers 18 (the rollers being rotatable about their respective shafts fixed on carriage C). In another form of a pellet mill in accordance with the above-identified pending U.S. patent application Ser. No. 09/192,436 filed Nov. 16, 1998, the ring die is stationary relative to a carriage which mounts and rotates the rollers about the axis of the ring die. In either type of pellet mill, the pelleting action will subject the rollers to very high temperatures and premature bearing failures, and at least in pellet mills having a rotating ring die, such failures have occurred as a result of overheating. The present invention is applicable to both forms of pellet mills.

Figure 2:
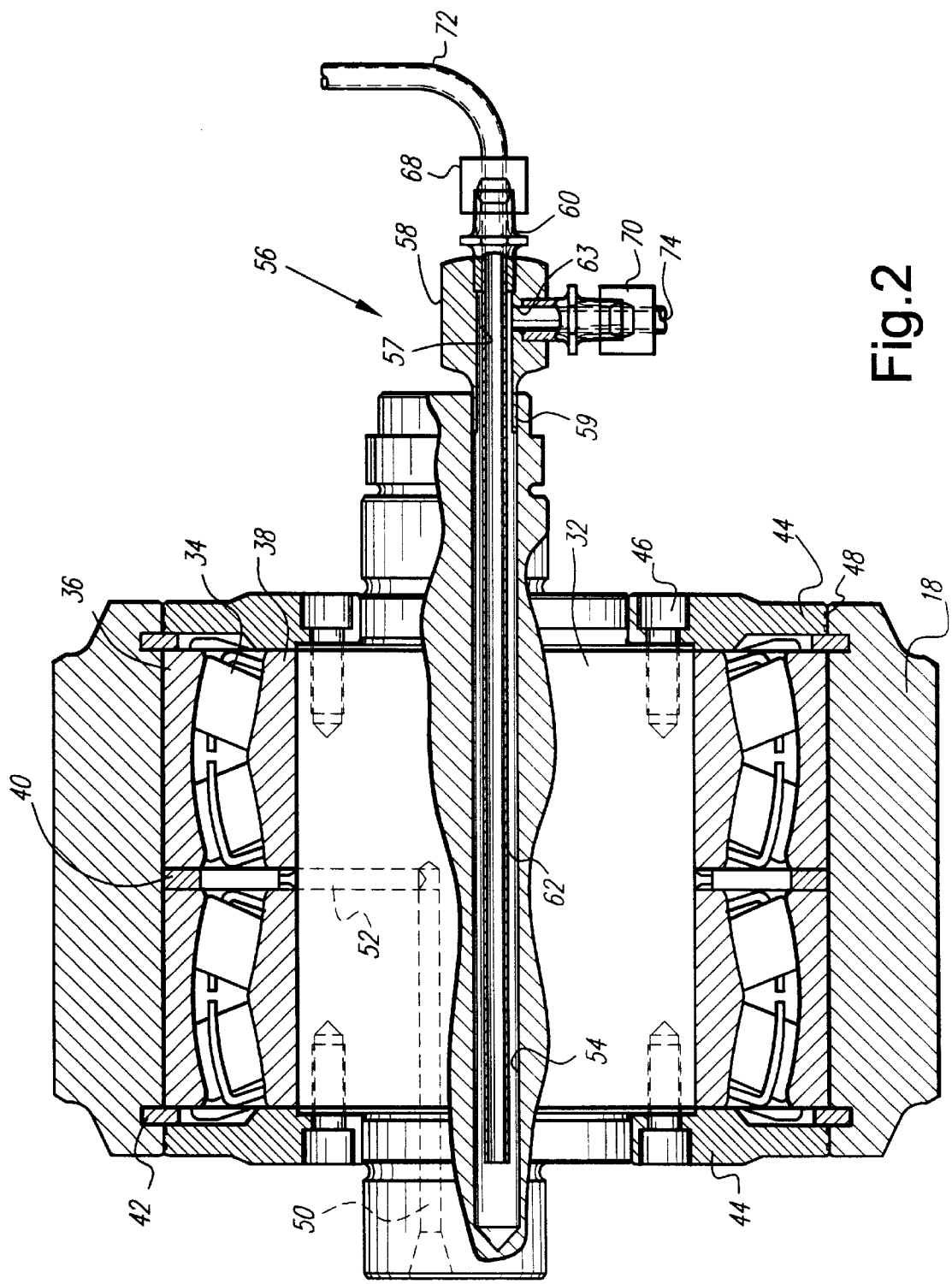
FIG. 2 is an enlarged cross-sectional view of a roller employed in the die cavity of the apparatus and illustrating the cooling medium supply and return passages.

Referring to FIG. 2, there is illustrated a single roller 18 mounted for rotation about a fixed shaft 32. Roller bearings 34 are disposed between the fixed shaft 32 and the rollers 18. In the particular form illustrated, spherical roller bearings 34 are employed in sets thereof which include outer and inner races 36 and 38, respectively, with the bearings therebetween. It will be appreciated that the inner races 38 are fixed to shaft 32, while the outer races 36 are fixed to the rollers 18. Intermediate and end retaining rings 40 and 42, respectively, rotate with the outer races 36 and maintain the bearings 34 spaced from cover plates 44 disposed at axially opposite ends of the rollers. The cover plates 44 are secured to the shaft, for example, by bolts 46. Grooves 48 are formed on the peripheral margins of the axial cover plates 44 to provide seals between the rotating roller 18 and the fixed cover plates 44. A grease inlet 50 is provided at one end of the shaft 32 for supplying grease to a plurality of radial passages 52 which, in turn, communicate the grease into the bearings 34.

Each shaft 32 includes a bore hole 54 which may extend coaxially with or along an axis parallel to the axis of shaft 32 and radially offset therefrom. The bore opening 54 is preferably formed through one end of shaft 32 and terminates short of the opposite end of the shaft. This facilitates installation of the cooling medium injection apparatus including the supply and return passages as described below.

The cooling medium injection apparatus or device, generally designated 56, is provided for supplying a cooling medium to bore 54 and returning the heated cooling medium from the bore. Particularly, apparatus 56 includes a fitting 58 having an inlet 57 and in which inlet is mounted a coaxial coupling 60 carrying an elongated tube 62. Coupling 60 is secured at one end of fitting 58 with the tube 62 extending through fitting 58 and into the bore 54 of the shaft. The fitting 58 has an extended end 59 which can be suitably secured to the shaft 32, for example, by a threaded or brazed joint. As illustrated, it will be appreciated that the tube 62 is of reduced diameter relative to the bore 54 such that the tube is spaced from the interior walls of bore 54. The tube 62 also terminates short of the end of the bore 54. There is thus formed coolant medium supply and return passages comprised of the tube 62 and the annular passage 64 between tube 62 and bore 54, respectively. Fitting 58 also has an outlet 63 and in which outlet is mounted a similar coupling 66 as coupling 60 in communication with the annular passage 64. Suitable connector nipples 68 and 70 may be applied to couplings 60 and 66, respectively, for receiving coolant medium supply tube 72 and heated coolant medium return tube 74.

From the foregoing description, it will be appreciated that the feed material supplied to the die cavity is extruded through the ring die openings 20 by the action of the relative rotation between the rollers 18 and ring die 14 to form pellets. Necessarily, the rollers rotate about the shafts 32 in either form of a pellet mill as noted above, i.e., wherein the ring die rotates or is stationary. In both cases, the rollers are subjected to high temperature from the pelleting process. By applying the cooling injection apparatus of the present invention to the rollers, a cooling medium, preferably water, may be supplied to the rollers to cool the bearings and the lubricant such that the potential for failure of the bearings is reduced or eliminated. Thus, a cooling medium, e.g., water, is supplied tubing 72 and passes through the fitting 58 along the interior of tube 62 to its end. The cooling medium reverses its axial direction of flow for return flow through the annular passageway 64 and to the return tube 74. The cooling water thus cools the bearings and the grease supplied the bearings. It will be appreciated that the cooling injection device hereof of a relatively simple construction and can be formed in the roller shaft by providing a single bore opening through one end of the roller shaft and extending in an axial direction relative to the axis of the roller. The injector per se is likewise of a simple and inexpensive construction. The cooling medium, e.g., water, can be supplied by gravity flow or forced flow from a pump, not shown. Additionally, the cooling water can be discharged into the die cavity through suitable passages formed in the roller shaft. Preferably, however, the cooling water is returned to a reservoir via tube 74.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pellet mill comprising:

a ring die defining a die cavity, said ring die having an axis and circumferentially and axially spaced die openings;

a carriage mounting a plurality of rollers in said die cavity, said rollers being mounted on shafts carried by said carriage and having axes parallel to said axis of the ring die;

a feeder for supplying feed material into said die cavity;

a drive for rotating one of said ring die and said carriage relative to another of said ring die and said carriage for extruding feed material in the nips between the ring die and the rollers through the die openings to form pellets;

bearings disposed between said shafts and said rollers;

cooling medium supply and return passages in each of said shafts generally parallel to said axes thereof; and a cooling medium inlet carried by each said shaft for supplying a cooling medium to said supply passage for cooling said bearings and a cooling medium outlet carried by each said shaft for receiving heated cooling medium from said return passage.

2. A pellet mill according to claim 1 wherein said supply and return passages are concentric with one another.

3. A pellet mill according to claim 2 wherein said coolant supply passage lies radially within said coolant return passage.

4. A pellet mill according to claim 1 wherein at least one of said supply and return passages lies radially offset from said shaft axis.

5. A pellet mill according to claim 1 including a passage in said shaft for admitting grease into said bearing and lying adjacent the cooling medium supply passage sufficiently to be cooled by the cooling medium in said supply passage.

6. A pellet mill comprising:

a ring die defining a die cavity, said ring die having an axis and circumferentially and axially spaced die openings;

a roller in said die cavity, said roller being mounted on a shaft having an axis parallel to said axis of the ring die, said shaft having a bore hole opening through one end of said shaft;

a feeder for supplying feed material into said die cavity;

a drive for rotating one of said ring die and said roller relative to another of said ring die and said roller for extruding feed material in the nip between the ring die and the roller through the die openings to form pellets;

bearings disposed between said shaft and said roller;

a cooling medium transmission device for supplying a cooling medium to said shaft for cooling said bearings and including a tube receivable in said bore hole and spaced from walls of said shaft defining an annular passage thereby defining a cooling medium supply passage through one of said tube and said annular passage and a cooling medium return passage through another of said tube and said annular passage; and a cooling medium inlet carried by said device for supplying a cooling medium to said supply passage and a cooling medium outlet carried by said device for receiving heated cooling medium from said return passage.

7. A pellet mill according to claim 6 wherein said supply and return passages are concentric with one another.

8. A pellet mill according to claim 7 wherein said coolant supply passage lies radially within said coolant return passage.

9. A pellet mill according to claim 6 wherein at least one of said supply and return passages lies radially offset from said shaft axis.

10. A pellet mill according to claim 6 including a passage in said shaft for admitting grease into said bearing and lying adjacent said cooling medium supply passage sufficiently to be cooled by the cooling medium in said supply passage.

11. A pellet mill according to claim 6 wherein said tube terminates short of an end of said bore in said shaft.

12. A pellet mill according to claim 6 wherein said device is secured to an end of said shaft with said tube extending in said bore hole.

\* \* \* \* \*